(12) United States Patent
De Zwart et al.

(10) Patent No.: US 10,429,659 B2
(45) Date of Patent: Oct. 1, 2019

(54) OPTICAL ARRANGEMENT AND AN AUTOSTEREOSCOPIC DISPLAY DEVICE INCORPORATING THE SAME

(71) Applicant: KONINKLIJKE PHILIPS N.V., Eindhoven (NL)

(72) Inventors: Siebe Tjerk De Zwart, Valkenswaard (NL); Marcellinus Petrus Carolus Michael Krijn, Eindhoven (NL); Fetze Pijlman, Eindhoven (NL); Oscar Hendrikus Willemsen, Den Bosch (NL); Martin Gerard Hendrik Hiddink, s-Hertogenbosch (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 185 days.

(21) Appl. No.: 15/620,962

(22) Filed: Jun. 13, 2017

(65) Prior Publication Data

US 2017/0343826 A1 Nov. 30, 2017

Related U.S. Application Data

(62) Division of application No. 12/993,868, filed as application No. PCT/IB2009/052233 on May 27, 2009, now abandoned.

(30) Foreign Application Priority Data

Jun. 2, 2008 (EP) ..................................... 08157432
Oct. 3, 2008 (EP) ..................................... 08165805

(51) Int. Cl.
*G02B 27/22* (2018.01)

(52) U.S. Cl.
CPC ....... *G02B 27/225* (2013.01); *G02B 27/2214* (2013.01)

(58) Field of Classification Search
CPC ... G02B 27/225; G02B 27/22; G02B 27/2214
(Continued)

(56) References Cited

U.S. PATENT DOCUMENTS 3,039,359 A 6/1962 Eggert
3,528,723 A * 9/1970 Rogers ................. G02B 5/3025
359/455

(Continued)

FOREIGN PATENT DOCUMENTS

EP 0791847 A1 8/1997
GB 2389192 A 12/2003
(Continued)

OTHER PUBLICATIONS

Chai, "Optical Crystals" in Weber, M. "Handbook of Laser Science and Technology Supplement 2:Optical Materials" Dec. 28, 1994, CRC Press, Supplement 2, p. 3.
(Continued)

*Primary Examiner* — William R Alexander

(57) ABSTRACT

An optical arrangement having at least a lens mode in which the optical arrangement is a lens arrangement having an array (9) of lenticular lenses (11) each of which has a particular lens surface shape such that, when tracing rays through a lenticular lens after they have entered one side of the lenticular lens, there exists at least one ray that hits the lenticular lens surface perpendicularly. This arrangement gives reduced banding and loss of intensity at steep angles when used in an autostereoscopic display.

12 Claims, 17 Drawing Sheets

(58) Field of Classification Search
USPC .......................................................... 359/463
See application file for complete search history.

(56) References Cited

U.S. PATENT DOCUMENTS

| | | | | |
|---|---|---|---|---|
| 3,712,727 | A * | 1/1973 | Bonnet | G03B 35/24 |
| | | | | 352/43 |
| 5,434,709 | A * | 7/1995 | Yamada | G02B 5/1871 |
| | | | | 359/569 |
| 5,461,495 | A * | 10/1995 | Steenblik | B29C 39/026 |
| | | | | 359/463 |
| 5,642,226 | A * | 6/1997 | Rosenthal | G02B 3/0031 |
| | | | | 359/454 |
| 5,657,166 | A | 8/1997 | Otaki | |
| 6,010,747 | A * | 1/2000 | Beeson | G02B 5/0215 |
| | | | | 264/119 |
| 6,064,424 | A | 5/2000 | Van Berkel et al. | |
| 6,473,238 | B1 * | 10/2002 | Daniell | H04N 13/307 |
| | | | | 359/622 |
| 6,628,460 | B1 * | 9/2003 | Ookawa | G02B 5/045 |
| | | | | 359/443 |
| 7,307,107 | B2 | 12/2007 | Feenstra et al. | |
| 2002/0080483 | A1 | 6/2002 | Yamaguchi et al. | |
| 2002/0085287 | A1 | 7/2002 | Egawa | |
| 2003/0085850 | A1 | 5/2003 | Feenstra et al. | |
| 2004/0179276 | A1 * | 9/2004 | Yamakawa | G02B 9/04 |
| | | | | 359/793 |
| 2004/0196253 | A1 * | 10/2004 | Eichenlaub | G02B 3/005 |
| | | | | 345/102 |
| 2004/0246578 | A1 * | 12/2004 | Shikama | G03B 21/625 |
| | | | | 359/457 |
| 2005/0046795 | A1 | 3/2005 | Toeppen | |
| 2006/0066945 | A1 * | 3/2006 | Yeo | G02B 3/0031 |
| | | | | 359/457 |
| 2006/0208284 | A1 | 9/2006 | Kaise et al. | |
| 2006/0250546 | A1 | 11/2006 | Miyao et al. | |
| 2007/0058127 | A1 * | 3/2007 | Mather | G02B 27/2214 |
| | | | | 349/159 |
| 2007/0258140 | A1 * | 11/2007 | Shestak | H04N 13/0404 |
| | | | | 359/465 |
| 2008/0068329 | A1 * | 3/2008 | Shestak | H04N 13/305 |
| | | | | 345/102 |
| 2009/0244270 | A1 * | 10/2009 | Takagi | G02B 27/2214 |
| | | | | 348/58 |

FOREIGN PATENT DOCUMENTS

| | | |
|---|---|---|
| JP | H08114764 A | 5/1996 |
| JP | 2001042805 A | 2/2001 |
| JP | 2003029205 A | 1/2003 |
| JP | 2006516753 A | 7/2006 |
| JP | 2006313279 A | 11/2006 |
| JP | 2006318886 A | 11/2006 |
| WO | 9821620 A1 | 5/1998 |
| WO | 2004070467 | 8/2004 |
| WO | 2006117707 A2 | 11/2006 |
| WO | 2007040471 A1 | 4/2007 |
| WO | 2007072289 A2 | 6/2007 |
| WO | 2007083149 A1 | 7/2007 |
| WO | 2007099488 A1 | 9/2007 |
| WO | 2008075249 A1 | 6/2008 |
| WO | 2009156968 A1 | 12/2009 |

OTHER PUBLICATIONS

Shannon: "A Mathematical Theory of Communication"; The Bell System Technical Journal, Jul., Oct. 1948, vol. 47, pp. 379-423, 623-656.

* cited by examiner $$\text{overlap} = \frac{\int f_1(\varphi) f_2(\varphi) d\varphi}{\sqrt{\int f_1(\varphi)^2 d\varphi} \sqrt{\int f_2(\varphi)^2 d\varphi}}$$

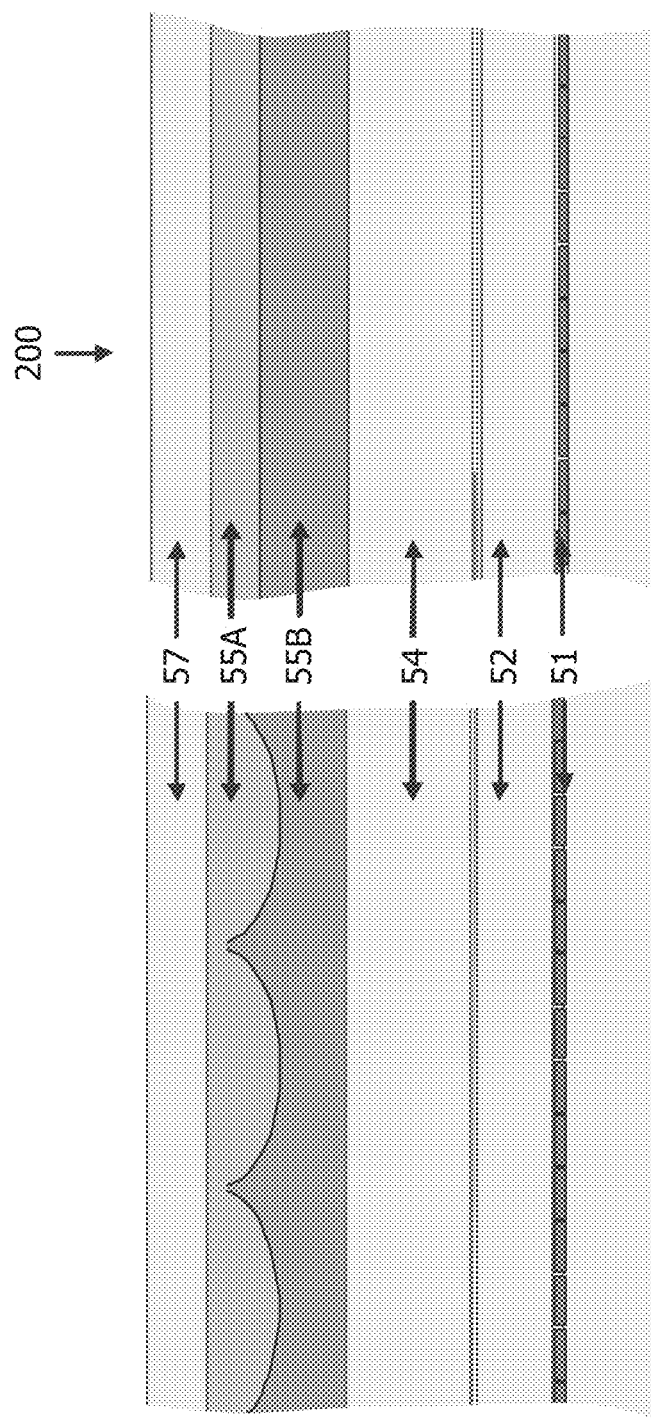

OPTICAL ARRANGEMENT AND AN AUTOSTEREOSCOPIC DISPLAY DEVICE INCORPORATING THE SAME

CROSS-REFERENCE TO RELATED APPLICATIONS

This is a divisional application of U.S. patent application Ser. No. 12/993,868, filed Nov. 22, 2010, which is a 35 U.S.C. 371 extension of International Patent Application No. PCT/IB2009/052233, filed May 27, 2009.

FIELD OF THE INVENTION

This invention relates to an optical arrangement for an autostereoscopic display device and an autostereoscopic display device incorporating the optical arrangement.

BACKGROUND OF THE INVENTION

A known autostereoscopic display device is illustrated in FIG. 1. This known device 1 comprises a two dimensional liquid crystal display panel (LCD) 3 having a row and column array of display pixels 5 acting as a spatial light modulator to produce the display in the form of a static image or dynamic images such as, for example, video. For the sake of clarity, only a small number of display pixels 5 are shown in FIG. 1. In practice, the display panel 3 might, for example, comprise about one thousand rows and several thousand columns of display pixels 5.

The structure of the liquid crystal display panel 3 is entirely conventional. In particular, it comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lens arrangement in the form of a lenticular sheet 9, arranged over the display side of the display panel 3, which performs a view-forming function. The lenticular sheet 9 comprises an array of semi-cylindrical lenticular lens elements 11. Each lenticular lens element 11 has a longitudinal axis 10 and the lens elements are extending such that their respective longitudinal axes are oriented parallel to one another. Only one lenticular lens element 11 is shown in FIG. 1 with exaggerated dimensions for the sake of clarity. Thus, an array of elongate lenticular lens elements 11 extending parallel to one another overlies the display pixel array, and the display pixels 5 are observed by a user or viewer through these lenticular lens elements 11. The lenticular lens elements 11 act as a light output directing means to provide different images, or views, from the display panel 3 to the eyes of a user positioned in front of the display device 1.

The above described device provides an effective autostereoscopic, or three dimensional, display device if the produced display or image comprises multiple views. Such a display or image will, hereinafter, be indicated to be an autostereoscopic image having at least two sub-images, each one of them representing a different view of the object to be displayed by the image. The at least two views are then displayed by the lens arrangement so that a viewer perceives a stereo, 3D or look-around impression of the object. In an arrangement in which, for example, each lenticular lens element 11 is associated with two columns of display pixels 5, the display pixels 5 in each column provide a vertical slice of a respective two dimensional sub-image. The lenticular sheet 9 directs these two slices and corresponding slices from the display pixel columns associated with the other lenticular lens elements 11, to the left and right eyes of a user positioned in front of the sheet, so that the user observes a single stereoscopic image.

In modifications of such a device, the lenticular lens elements may be oriented with their longitudinal axes slanted with a slant angle with respect to the pixel column direction of the display panel or autostereoscopic image. The modification provides advantages in terms of pixel resolution loss sharing between horizontal and vertical display panel directions. As this is not the subject of the present invention, for a more detailed explanation on the effects and mode of application reference is made to U.S. Pat. No. 6,064,424.

SUMMARY OF THE INVENTION

It is an object of the invention to provide an optical arrangement and an autostereoscopic display device incorporating such an optical arrangement with improved performance.

This object is achieved with the optical arrangement, the autostereoscopic display device employing the optical arrangement and the method of displaying an autostereoscopic image with the optical arrangement of the subject invention.

The invention provides an optical arrangement that has, when it is in its lens mode, a lens arrangement with an array of lenticular lens elements each of which has a particular lens surface shape that, when tracing rays through the lenticular lens element after they have entered one side of the lenticular lens element, there exists at least one ray that hits the lenticular lens surface perpendicularly. Such an optical arrangement in its lens mode gives optimized optical effect in that when viewing an image through it under large off-normal viewing angles, image distortion is reduced. Hence, when applied to display autostereoscopic images, a marked improvement with respect to the so-called banding phenomenon and/or with respect to daylight cross-talk and/or dependency of the autostereoscopic effect upon the angle with which a viewer observes the autostereoscopic image on an autostereoscopic display device is obtained.

It was found by the inventors that a characteristic associated with the use of cylindrical lenticular lenses, such as, for example, in the prior art device described in the preamble, is that, because of field curvature, the intensity footprint changes with viewing angle. The intensity footprint can be considered to be the size of an area of illumination derived from a parallel beam with a width of one lens, which has passed through the lens at a given angle. The footprint size is measured at the display pixel plane. A narrow footprint means the lens is in focus at the display pixel plane, whereas a larger footprint means the lens is in focus at a different location, somewhere above or below the display pixel plane. A large footprint corresponds to angular divergence of the views.

FIG. 2 is a graph illustrating the relationship between intensity (I) on the y-axis (in arbitrary units a.u.) and position (P) at the pixel plane on the x-axis (millimeters) contributing to an image for viewing angles (VA) between 0° and 50° (annotations on the right of the FIG. 2). The graphs corresponds to a display having a lenticular lens element that is optically isotropic and for which there is a refractive index difference at the lens surface of 0.5 between the refractive indices of the lens and air. In the FIG. 2, the positions on the x-axis of pixels which contribute to a particular view are displayed. It can be seen that the footprint size is very large for viewing angles greater than 30°, where a large physical width of pixels contribute to the view. Note that the dotted lines are the results after being convoluted with a top-hat distribution taking into account the effect of pixel size and the slant angle with which the lenticular lens elements are slanted with respect to the column direction of pixels. A large footprint size is undesirable since it causes excessive overlap between views, generating excessive crosstalk between views and therefore reduces the 3D impression.

In addition to the broadening of views shown above for large viewing angles, a banding effect, which is often referred to as a Moiré-type of artefact, can also arise for smaller viewing angles. This is caused by the fact that the focus of the lenticular lens elements shifts towards the viewer with increasing, off-normal, viewing angle.

The lens arrangement of the optical arrangement of the present invention reduces and/or mitigates these and other effects.

In the claims, the terms 'first and second layer' are not to be construed as necessarily meaning to refer to continuous layers. Thus, for example, the first layer may be composed of multiple volumes with a first refractive index embedded in the second layer having the second refractive index. This is further explained with reference to the description concerning switchable optical arrangements according to the invention.

The desired advantageous effects of the invention increase with increasing magnitude of the product of the first refractive index with the lens pitch divided by two times the radius of curvature. Thus, for example, the viewing angle under which an autostereoscopic image displayed by that device may be observed with improved quality increases with increasing this product. Thus, preferably, the lens arrangement is designed such that the product is greater than 0.6, 0.7, 0.8, 0.9, 1.0, or even 1.1. Preferably, the product is greater than 0.8, this provides a balance between the effect obtained and the manufacturability of the optical arrangement with respect to materials needed.

The desired effect is dependent on the lens pitch within the array of lenticular lens elements. The lens pitch is to be construed as the width of a lenticular lens element measured in a direction of curvature. The lens pitch is thus measured perpendicularly to, for example, the longitudinal axis of the lenticular lens element 11. The radius of curvature at the center of the lenticular lens element is the radius of curvature as measured in the middle of the lenticular lens element or halfway a lens pitch within a section of the lenticular lens element taken perpendicular to the longitudinal axis 10.

The lens pitch may be bound by a minimum value determined by the autostereoscopic image to be displayed. For example, the lower boundary of the lens pitch may be determined by the resolution or number of views of an autostereoscopic image and thus the number and dimensions of display panel pixels that is associated with one lenticular lens element in a display device. When using the minimum applicable lens pitch, the product may be adjusted by designing the lens with appropriate radius of curvature or first index of refraction.

The desired advantageous effect may be dependent on the orientation of the lens with respect to an autostereoscopic image to be projected by it, or observed through it. This dependency will be larger when the refractive index difference between the first refractive index and the second refractive index is larger. One can define the optical arrangement and therewith the lens arrangement to have a viewer side and a display side. The optical arrangement preferably has the first layer as its viewer side as then the advantageous effect obtained is largest.

In an embodiment of the lens arrangement, the first refractive index is the lowest refractive index of the first and second refractive indices. This has the advantage that the desired effect based on the design criteria for the particular design is achieved independent of orientation of the lens arrangement with respect to an autostereoscopic image to be displayed.

The difference between the refractive indices of the respective materials, Δn, is preferably smaller than in conventional lenses, in particular, in the range 0.05-0.22. This not only reduces the dependency on orientation explained here above and therewith creates freedom of use, but also provides a lens arrangement with less reflectance, enabling the observing of images with fewer disturbances caused by these reflections. Other possible refractive index difference ranges are 0.05-0.15 and 0.09-0.12. The difference may be 0.1.

The highest refractive index of the first and second refractive indices may be in the range 1.4 to 1.65. This may be achieved, for example, by providing the relevant first or second layer such that it comprises an acrylic material or polycarbonate. A high refractive index is particularly advantageous for the desired effect if the high refractive index is the first refractive index, as then a higher radius of curvature may be used, translating to less curved lenses that are more easy to manufacture than more curved lenses.

The layer having the lowest refractive index may have a refractive index in the range 1.3 to 1.5, for example by providing that that the layer having this refractive index comprises a silicone material. The first and second materials may have substantially the same Abbe number.

The first and second layers may be made of all solid material, so that no support layers or substrate layers are needed. Alternatively, one of the layers, e.g., the first layer, may be a solid layer while the other layer, e.g., the second layer is a liquid or gas. The one solid layer then may have the shape of the lenticular lens surface required. In these cases, support layers may be added to the optical arrangement such that the lens arrangement is sandwiched between the support layers.

The first and second substrates preferably comprise planar glass or polymer material such as, for example, polycarbonate or other transparent materials.

The first layer may comprise a lens layer which defines convex lenticular lens shapes, and has a higher refractive index than the second material, which comprises a replica layer and fills the spacing between the convex lenticular lenses.

The optical arrangement may be a switchable arrangement that can switch between the lens mode and a further mode of operation. The further mode may, for example, have no substantial lens effect. Such an optical arrangement with a further mode without lens effect would enable autostereoscopic viewing with the advantages of the lens mode and two dimensional viewing in the further mode with the advantages of high resolution ideal for, e.g., text display. The switchable arrangement may comprise one or more electrodes and an electro-optic material or layer such as a liquid crystal material in combination with one or more polarisers.

According to the invention, there is provided an autostereoscopic display device comprising an image providing means and the optical arrangement positioned in front of the image providing means. The image providing means preferably comprises an array of image pixels or display pixels being arranged in rows and columns, for defining an autostereoscopic image. The optical arrangement is arranged so that in the lens mode of the optical arrangement, the direction of outputs of groups of the image or display pixels are projected in respective different directions as a plurality of views. The image providing means may be a means for providing a static image in any kind of form, such as, for example, an autostereoscopic postcard or photo. Alternatively, the image providing means may be an electronic display means providing static and/or dynamic autostereoscopic images. Such an electronic display means includes but is not limited to a liquid crystal display, a plasma display, cathode ray tube display or light emitting diode based display. The autostereoscopic display benefits from the advantageous as explained here before. Especially a display wherein the optical arrangement is positioned such that when in the lens mode, the first layer is on the viewer side of the optical arrangement is advantageous for the obtained advantage as described here above.

The optical arrangement may be mechanically attachable and/or detachable from the image display means.

According to the invention there is provided a method of displaying an autostereoscopic image, comprising providing an autostereoscopic image and projecting the autostereoscopic image through a lens arrangement according to the invention.

BRIEF DESCRIPTION OF THE DRAWINGS

Embodiments of the invention will now be described, purely by way of example, with reference to the accompanying drawings, in which:

FIGS. 18A and 18B show a schematic cross-sectional view of an example of an autostereoscopic display device according to an embodiment of the invention.

The dimensions of the diagrams are not to scale and like reference numerals refer to like elements throughout the text.

DETAILED DESCRIPTION OF EMBODIMENTS

Figure 1:
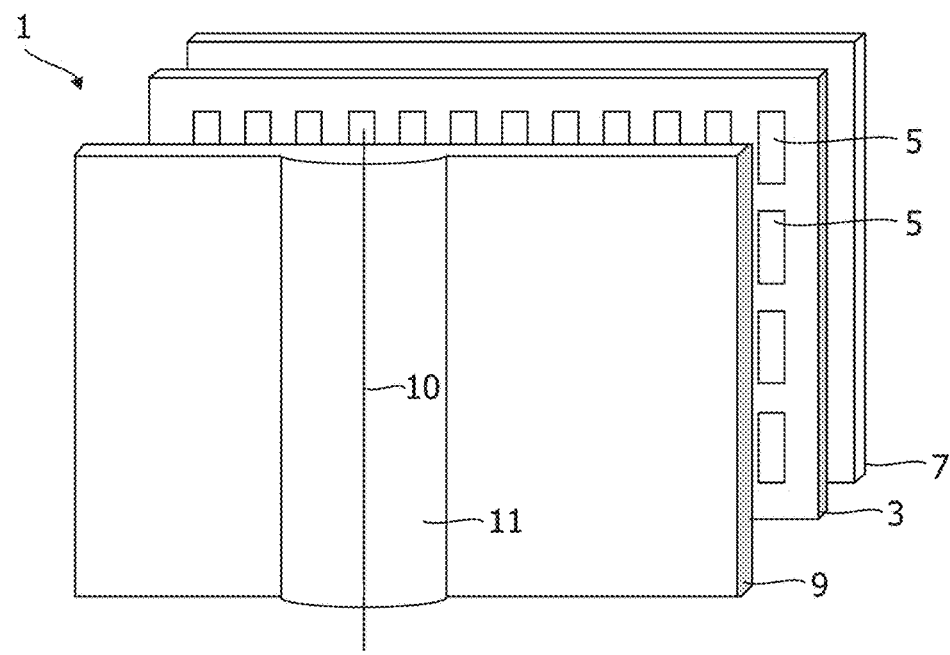
FIG. 1 is a schematic perspective view of a known autostereoscopic display device.
Figure 2:
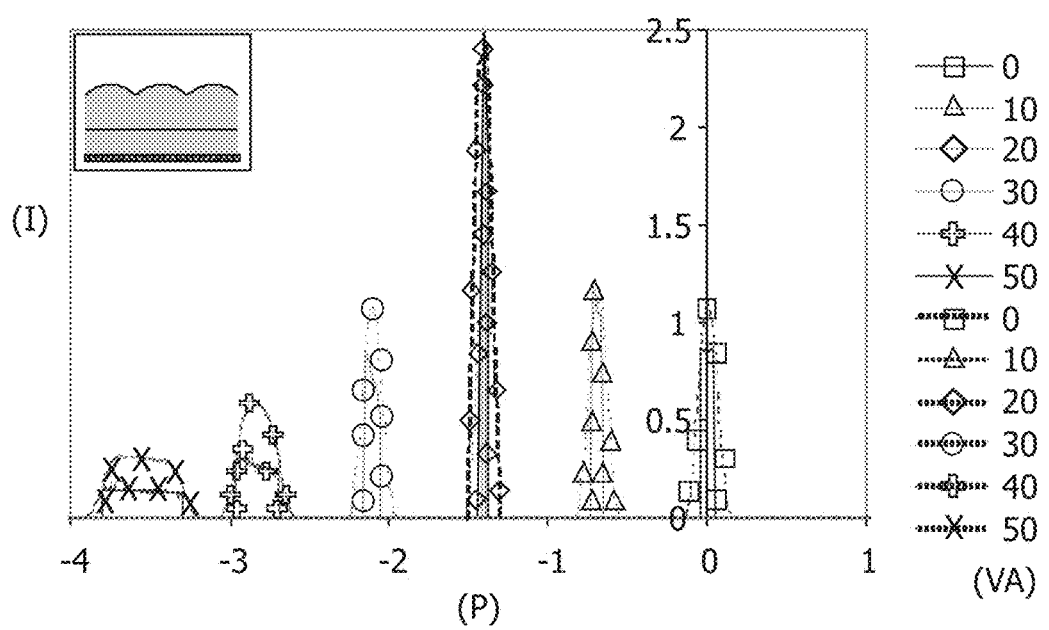
FIG. 2 is a graph illustrating an exemplary relationship between intensity and position at the pixel plane contributing to an image produced by the device of FIG. 1 for viewing angles between 0° and 50°.
Figure 3:
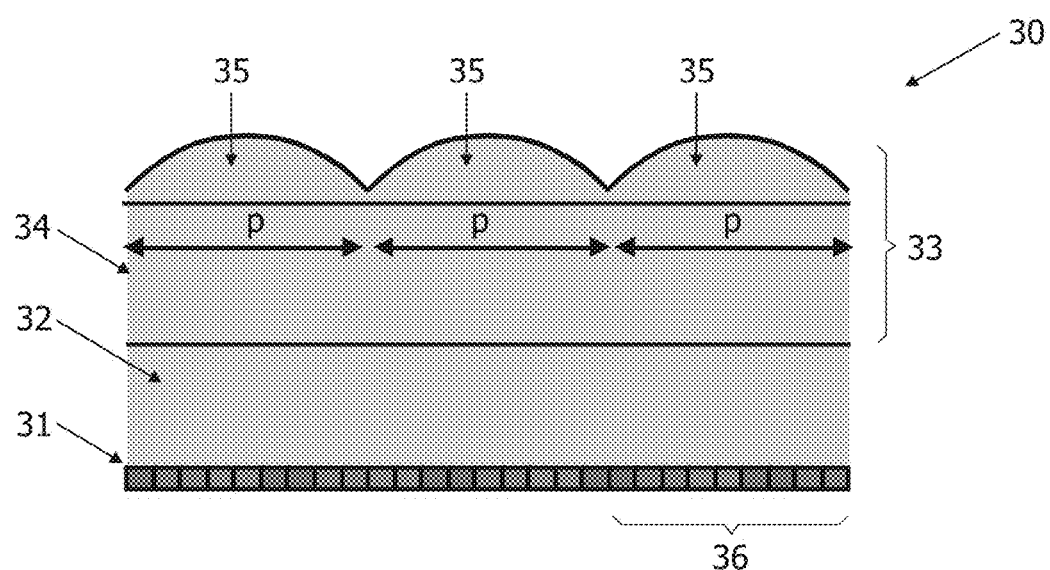
FIG. 3 is a schematic cross-sectional view of a known autostereoscopic display device.

FIG. 3 shows a schematic view of a typical known autostereoscopic or 3D display device 30. It consists of a display panel in the form of a liquid crystal display (LCD) display 31, with a glass spacer plate 32. The 3D display device has as its optical arrangement, a lens arrangement 33, for example, comprising acrylic lenses 35 over a glass substrate 34. FIG. 3 shows a cross sectional view of the display of FIG. 1 perpendicular to the longitudinal axis of the lenticular lenses. Three lenses 35 are shown having a width equal to the lens pitch array p. In this design, the refractive index difference at the lens boundary, i.e., the surface of the lenses 35 at their side opposite to the glass substrate 34, is approximately 0.5, as the interface is between the lens layer having, for example, a refractive index of 1.5 and air.

In this particular case, 9 display pixels are associated with every lenticular lens 35, meaning that each lens overlays a group 36 of 9 pixels and therewith in principle could create 9 views as each pixel image is sent to a different direction one overlying lens.

Figure 4A:
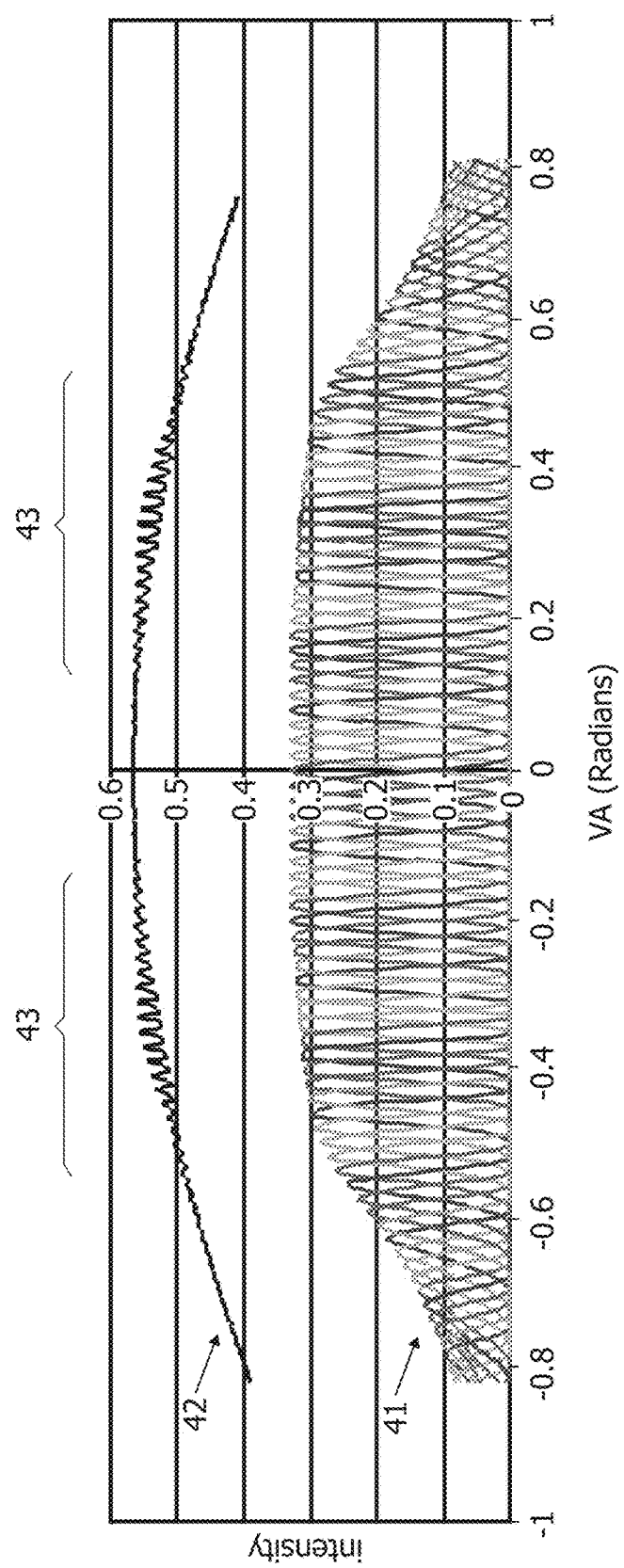
FIGS. 4A-4C show graphs illustrating, in more detail, the view overlap, view broadening and loss of intensity at large viewing angles which can arise with the known lens structure of FIG. 3.

FIG. 4A shows the light intensity (I) as a function of the viewing angle (VA) for a 42 inch (107 cm) product according to the geometry of FIG. 3. The lower set of curves show the individual views 41, which, for reasons of clarity, have not all been indicated with the reference numeral. The total intensity integrated over all views is shown in the upper curve 42.

Figure 4B:
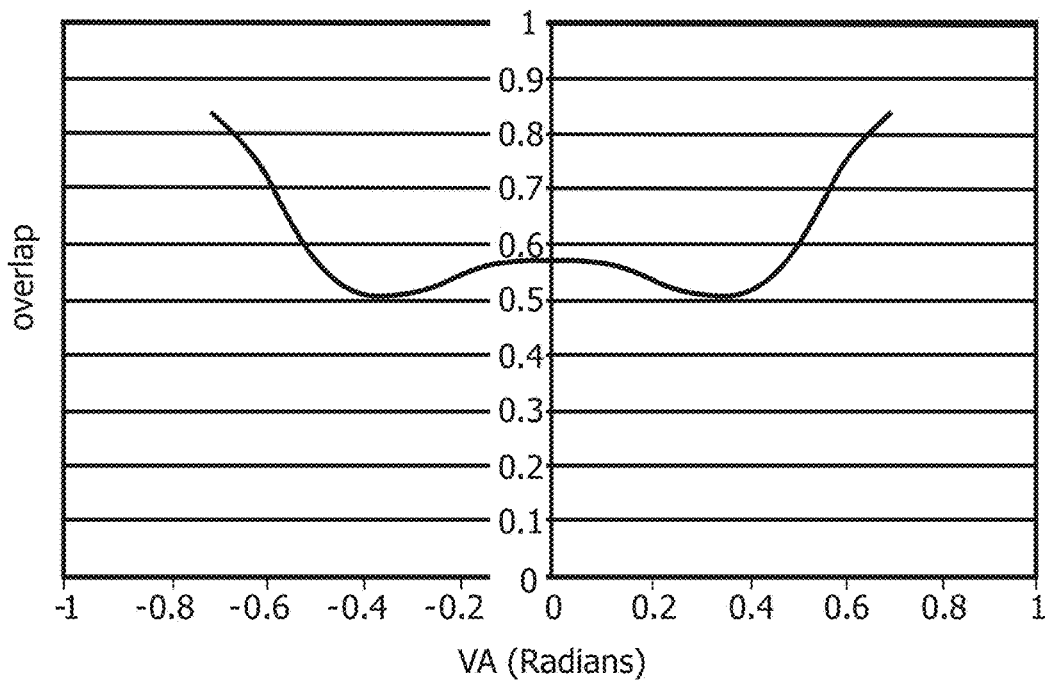
Figure 4C:
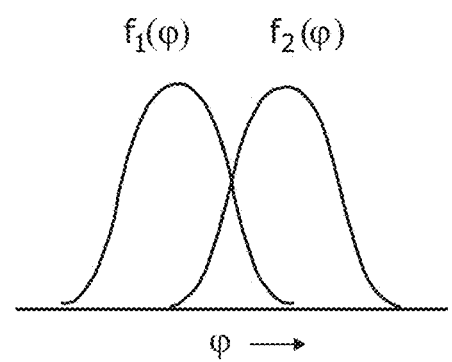

For increasing angels beyond 0.4 radians, the width of the views 41, for example, measured as full width at half maximum, increases significantly, and this is also accompanied by a drop in intensity I. The drop in intensity is especially evident from views 41 at viewing angels beyond 0.5 radians. The drop in intensity is also found from the upper curve 42 which bends downwards in the graph of FIG. 4A. The view width can be seen to increase because the sides of the curves become less steep. As an illustration, FIG. 4B shows the overlap (0) between neighboring views 41 as a function of the viewing angle (VA). The overlap (0) is defined in FIG. 4C. By definition, two completely separated views have zero overlap and identical views have an overlap that equals one. In FIG. 4B, a relatively steep increase in the overlap occurs for angles exceeding 0.4 radians. The larger the overlap, the more crosstalk between views.

It is further observed from the upper curve 42, that intensity variations occur especially for viewing angles in the ranges 43, i.e., approximately between a viewing angles of −0.1. to −0.6 or 0.1 to 0.6 radians. These variations are perceived by the viewer as the banding previously mentioned.

The invention provides an optical arrangement having, in its lens mode, a lens array consisting of the corrugated interface of two different materials. The lens geometry and material composition is designed in a way which optimizes the lens performance, as explained further below, to obtain the advantage effect of the invention.

Figure 5:
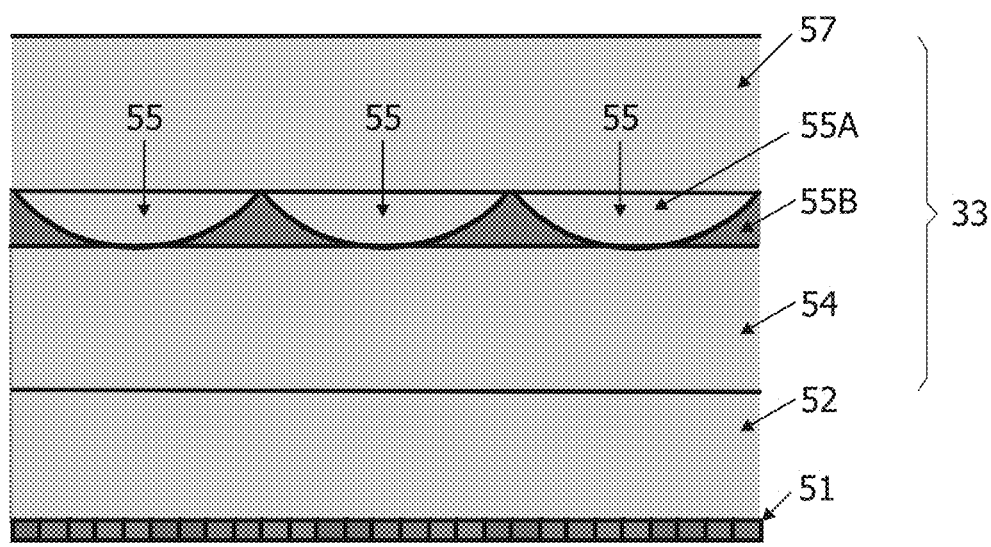
FIG. 5 is a schematic cross-sectional view of an example of an autostereoscopic display device according to an embodiment of the invention.

FIG. 5 shows an embodiment of an autostereoscopic display device 50 according to the invention. The device has an image forming means in the form of a display panel 51 with a glass plate 52. The autostereoscopic display device has an optical arrangement 53 according to the invention on top of the image forming means. In this particular case, the arrangement is not switchable and is in its lens mode permanently. The embodiment comprises an array of semi-cylindrical lenticular lenses 55 that are oriented parallel with their longitudinal axes. The lens array comprises first layers 55A and second layers 55B sandwiched between planar glass substrates 54, 57. The interface between the first 55A and second layer 55B defines the corrugated lens surface 58. In this particular case, the first and second layers are optically isotropic and have a refractive index difference between 0.05 and 0.22 for radiation within the visible light spectrum.

The first layer 55A comprises a lens layer which defines convex lenticular lens shapes facing the planar glass substrate 54. In the present embodiment this layer comprises a material with a refractive index of around 1.5, for example, an acrylic material including: 80% Ethoxylated bisphenol A diacrylate (SR-349 from "Sartomer Company, Inc") and 20% trimethylolpropane triacrylate (TMPTA) with a refractive index of around 1.53. The second layer 55B is made of a silicone rubber material (Elastosil RT604 from "Wacker chemicals Inc") and has a refractive index of around 1.41.

Although the example is described with the aforementioned combination of first and second layers, combinations of other layers can be equally well applied within the general concept of the invention. Thus, for example, the refractive index of the first layer may be in between 1.4 and 1.6 so that polycarbonate with a refractive index of around 1.59 may be used together with the silicone rubber material. Yet still other materials with appropriate refractive indices may be used without loss of effect of the invention.

Also, the invention is not restricted to these ranges of refractive indices or the ranges of refractive index difference to the materials defined here above. The materials mentioned can be replaced by any other materials with the appropriate refractive index chosen such that the required difference of refractive index is obtained in relation to the radius of curvature and lens pitch desired for the lens surface according to the invention. Various modifications will be apparent to those skilled in the art.

The acrylic material lens structure of the present embodiment can be made by a replication process. In such a process, a mold is provided having a relief surface that is complementary to the shape of the lens, i.e., for example, the layer 55A. In a replication step, the layer material is brought in contact with the mold such that it takes the relief shape of the mold and is fixed in that shape. The resulting lens can be attached to a substrate layer 57, for example, for providing strength during molding or afterwards. The substrate can be removed if it was just to sustain the lens structure during the replication process. The replicated lens, with or possibly without the substrate layer is then embedded into a silicone layer that is supported by a support layer such as, for example, a glass plate or plastic plate. The acrylic material mentioned hereinbefore may be conveniently used in such a process. However, any other material that can be molded in such a way may be used as long as the final result is a layer with the appropriate refractive index when compared to that of the other layer. Alternatively, the silicone layer is applied to the replicated lens followed by application of the support layer. Any one of the substrate layer or the support layer may be made, for example, of glass. Glass has, among others, the advantage of having a flat surface and is commonly used within the display industry. It will be evident that the substrate layer and/or support layer must be able to withstand possible conditions during the manufacturing steps so that the resulting structure is prevented from unwanted distortions and the like.

Alternatively, the lens structure may be mechanically machined. In general this requires lens materials that are solid at the machining conditions (temp and pressure) For example, a polycarbonate lens may be made advantageously in this way.

In the embodiment of FIG. 5, the lens arrangement 53 has been incorporated in an autostereoscopic display device 50 according to the invention. Thereto the lens arrangement is attached to a display panel in the form of a (LCD) 51 having a glass spacer plate 52.

Figure 6:
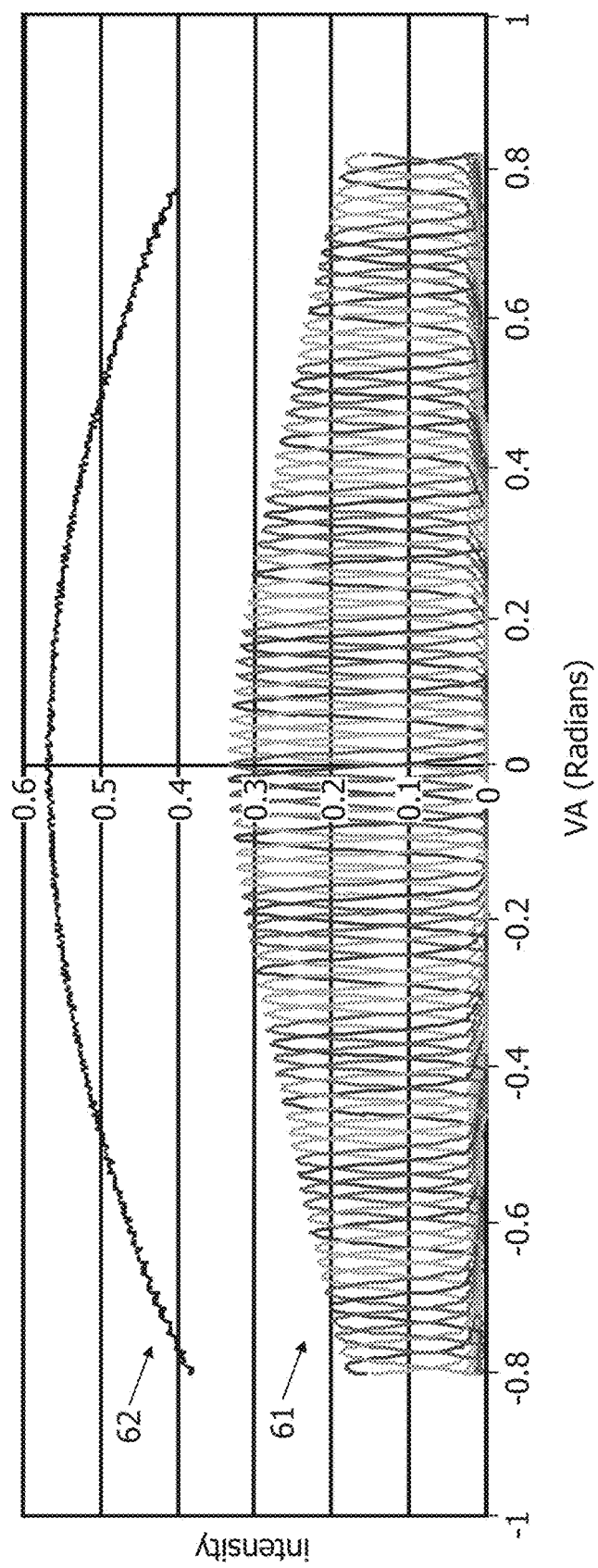
FIG. 6 shows the reduction in view broadening and improvement in intensity at large viewing angles which is achieved by the lens arrangement of the invention.

FIG. 6 shows the light intensity (I) as a function of the viewing angle (VA) for a 42 inch (107 cm) autostereoscopic display device according to the geometry of FIG. 5. As in FIG. 4, the lower set of curves 61 (not all annotated with reference numerals) show the individual views. The total intensity is shown in the upper curve 62.

A typical lens radius for the structure of FIG. 3 is 2.212 millimeter, but in FIG. 6, the lens radius (R) is only 0.519 millimeter. This is because the focal distance is approximately equal to the quotient of lens radius (R) and refractive index difference of the layers defining the lens surface, and the focal distance parameter is thus kept approximately constant for the lens structure of the invention to be used in the same application as the known lens structure of FIG. 3. The precise desired radius can be determined to minimize the banding intensity, and this is explained below. The reduced lens radius gives rise to deeper lenses if the lens is to cover the same area, i.e., cover the same number of columns of pixels of a display means. In this case, that would be 9 pixels in the groups 36 or 56 of FIGS. 3 and 5, respectively.

FIG. 6 shows that, apart from a low intensity tail, the broadening of the views is much less for the design of the invention. Moreover, the banding has reduced significantly. This is partly due to the somewhat smaller field curvature of the lens. For a similar geometry, with the acrylic part of the lens oriented towards the viewer, a similar behavior is observed, but with the low intensity tail of the views oriented away from the origin.

Figure 7:
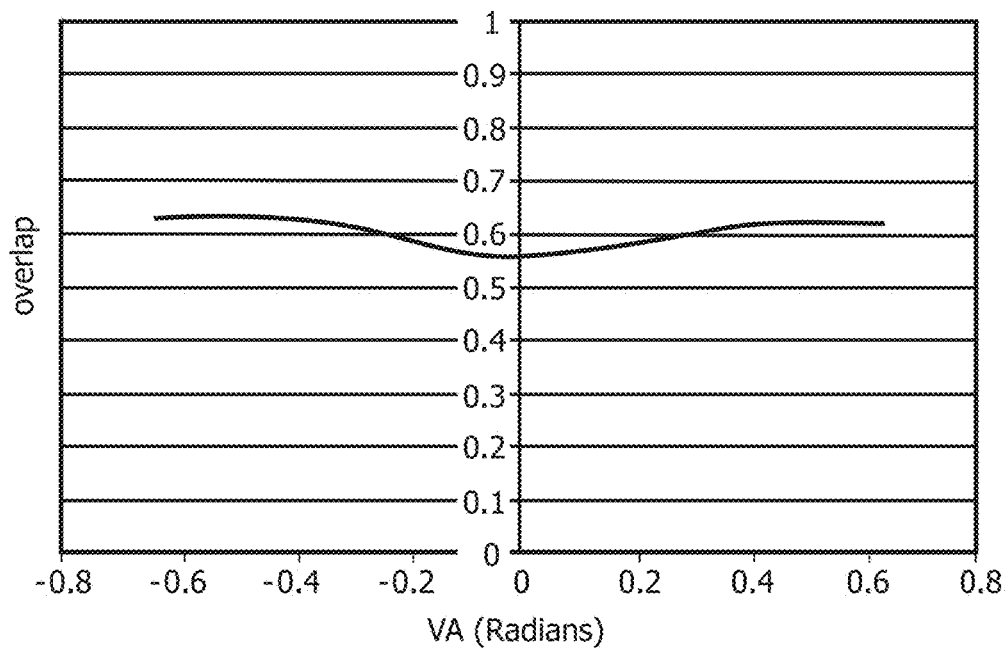
FIG. 7 shows the reduction in view overlap which is achieved by the lens arrangement of the invention.

FIG. 7 shows the overlap as a function of viewing angle for comparison with FIG. 4B. For the lens design of the invention, the overlap-curve is very flat. The design gives a marked improvement in the viewing experience under larger off-normal viewing angles (VA).

In addition to the reduction in cross-talk and banding, the design of FIG. 5 has the additional advantage of a low reflectivity. The upper flat surface of the upper glass plate 57 can be easily coated with an anti-reflection coating. Due to the low refractive index difference, the lens structure itself has low reflection. Another advantage is that the outer surface of the device is flat and robust. There is no need for an additional protective plate in front of the display as one of the lens arrangement substrates can provide this function.

The lens design of the invention thus provides a reduction in angular dependent cross-talk, a reduction in banding, low reflectivity and a design which can be arranged with robust flat sides having advantages for several reasons mentioned hereinabove.

Although in the examples given above, the first and second layers are sandwiched between substrate layers, this is not mandatory. In an embodiment, the first layer 55A and the substrate layer 57 are one and the same layer. Accordingly, the second layer 55B and the substrate layer 54 may be one and the same layer. This may especially be so when the first and second layers are strong enough so that no substrate layers are necessary.

In an alternative embodiment of an autostereoscopic display device according to the invention, the layer 52, which is part of the display panel in the embodiments given here above, may form the substrate layer of the lens arrangement, thus combining the function of these layers with the opportunity to reduce cost, weight or manufacturing time.

As mentioned above, the lens array is designed not only based on the refractive index difference, but also based on the geometry of the lens, in particular, the lens radius R and lens pitch p.

Figure 8:
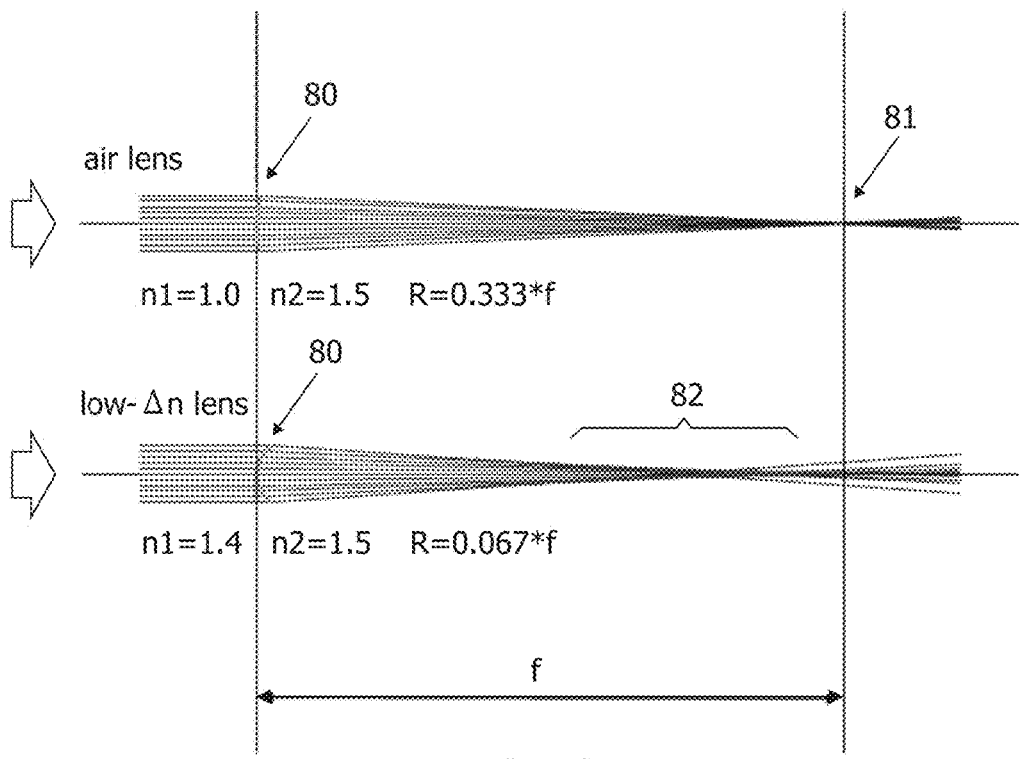
FIG. 8 shows how the performance of a lens in accordance with the invention differs from a conventional lens.

FIG. 8 schematically shows how the performance of a lens 80 with high refractive index difference and therefore small curvature (top part of FIG. 8), differs from a lens with low refractive index difference and therefore large curvature (bottom part of FIG. 8). The top part of FIG. 8 shows a lens with refractive index difference 0.5 with air at one of the interfaces, and lens radius of 0.333 times the focal length. The bottom part of FIG. 8 shows a lens with refractive index difference 0.1 and lens radius of 0.067 times the focal length.

Light is entering the lens 80 coming from the left. The high refractive index air lens provides a well shaped beam with well defined focus 81. The low refractive index difference lens has larger curvature and therefore more spherical aberrations. The beam behind the lens shows so-called "caustics" in region 82. In this region, the rays catch up onto each other, giving a local high intensity. The focal distance f is the distance behind the lens at which rays close to the axis intersect.

Figure 9:
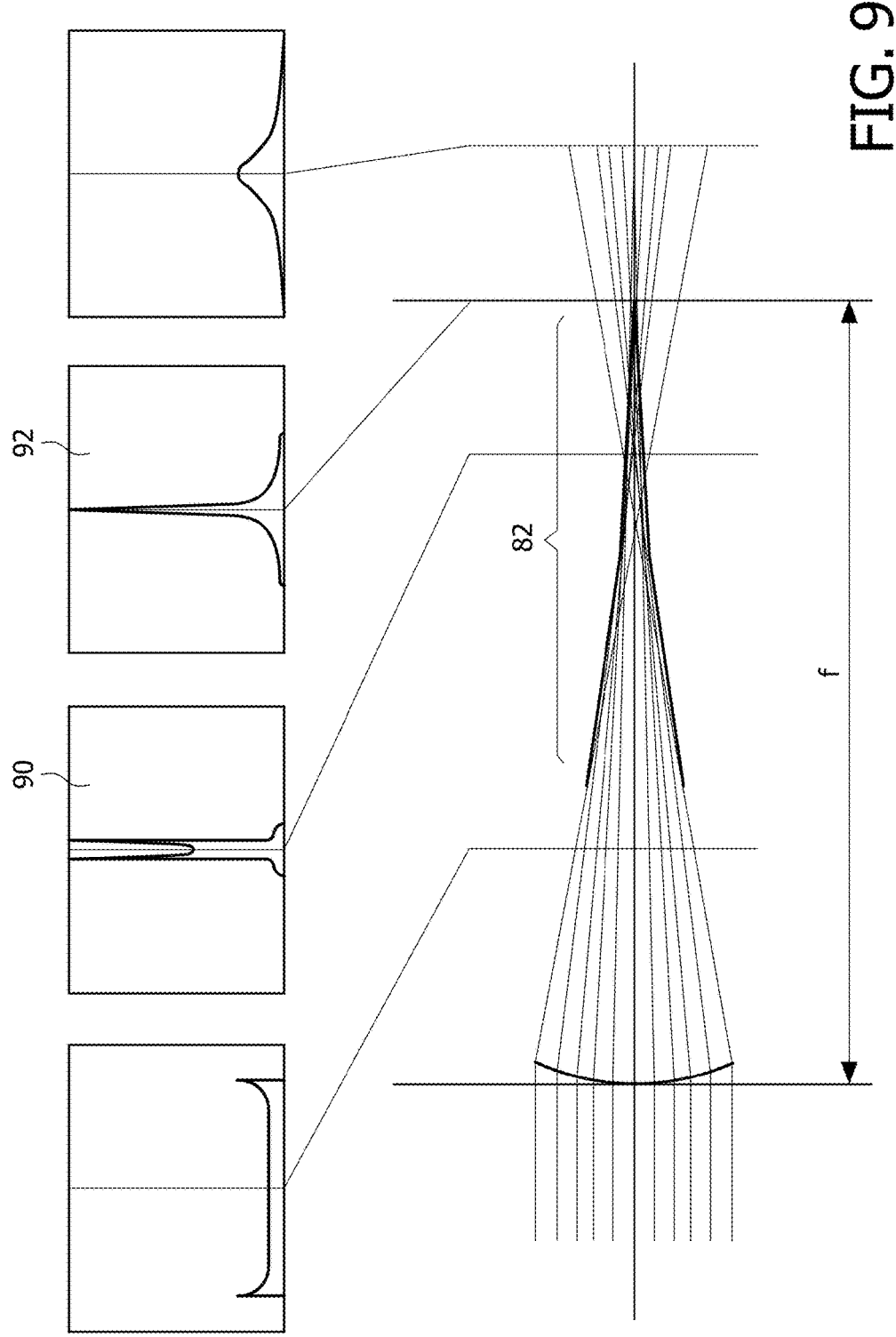
FIG. 9 shows an expanded view of FIG. 8.

FIG. 9 shows an expanded view of the lower example from FIG. 8. The intensity distribution at several positions along the beam is shown. In the region 82 where the caustics occur, the beams show two loci with intensity maximas (see plot 90). At the tip of the caustics (plot 92), the two loci coincide to form one point of high intensity. To the right of this point, the intensity distribution becomes smooth again. Plot 90 can be considered to be a "caustic edge" of the lens, and plot 92 is the "caustic tip".

Figure 10:
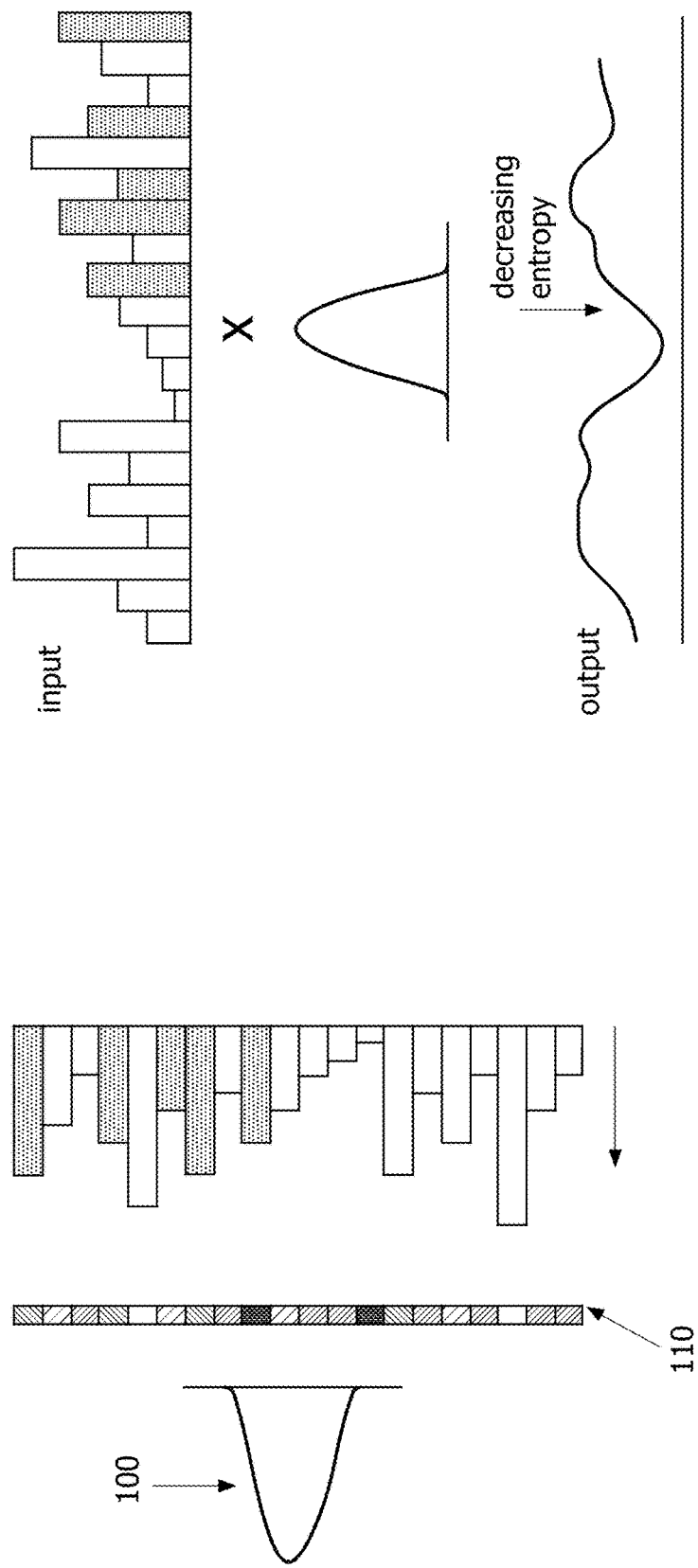
FIG. 10 shows how the lens function can be considered as a function which probes the pixel structure.

The invention is based on the understanding of how this optical performance, which suffers from worse optical aberrations, can give rise to the improved angular performance as explained above. In order to understand how the lens design influences the performance of the optical system, the lens function can be considered as a function which probes the pixel structure. This is explained schematically in FIG. 10. The left part shows a beam profile 100, created by the lens that is not shown, modulating light associated with the pixels of the pixel array 102. This is a low-pass filter convolution function as shown in the right of FIG. 10.

The convolution function results in a loss of information entropy (see, for a more detailed explanation of the term Information Entropy, for example, C. E. Shannon in "A Mathematical Theory of communication", The Bell System Technical Journal, Vol. 27 pp. 379-423, 623-656 July, October, 1948).

Figure 11A:
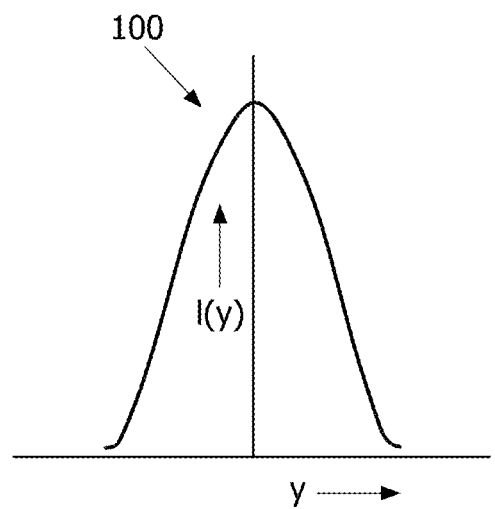
FIGS. 11A and 11B are graphs showing the beam intensity distribution function.

FIG. 11A shows the beam intensity distribution function 110 as a value I(y) where y is the displacement from the central axis.

The entropy loss is based on the Fourier transform of the function 110:

$Y(k) = \mathscr{F}(I(y))$

The entropy loss is defined as:

$$\Delta H = -\frac{1}{W}\int_W \log(|Y(k)|^2)dk$$

Figure 11B:
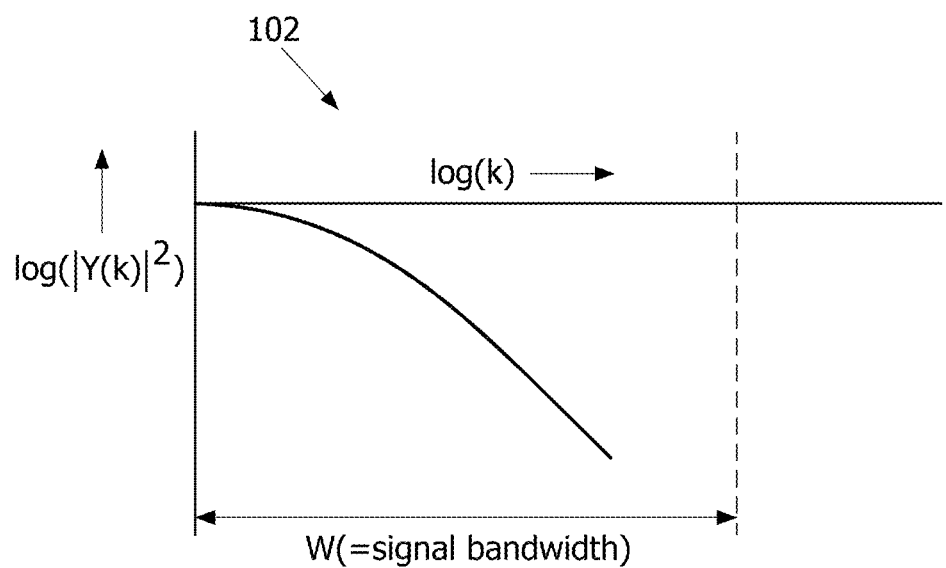

FIG. 11B shows the log value 112 used to derive the entropy loss.

A beam profile with the slowest decaying log function (i.e., the slowest decaying power spectrum) will have the least information loss (the smallest area between the curve of FIG. 11B and the x-axis), and therefore contain the most high frequencies. This can be considered to represent a "sharpness" function.

Figure 12:
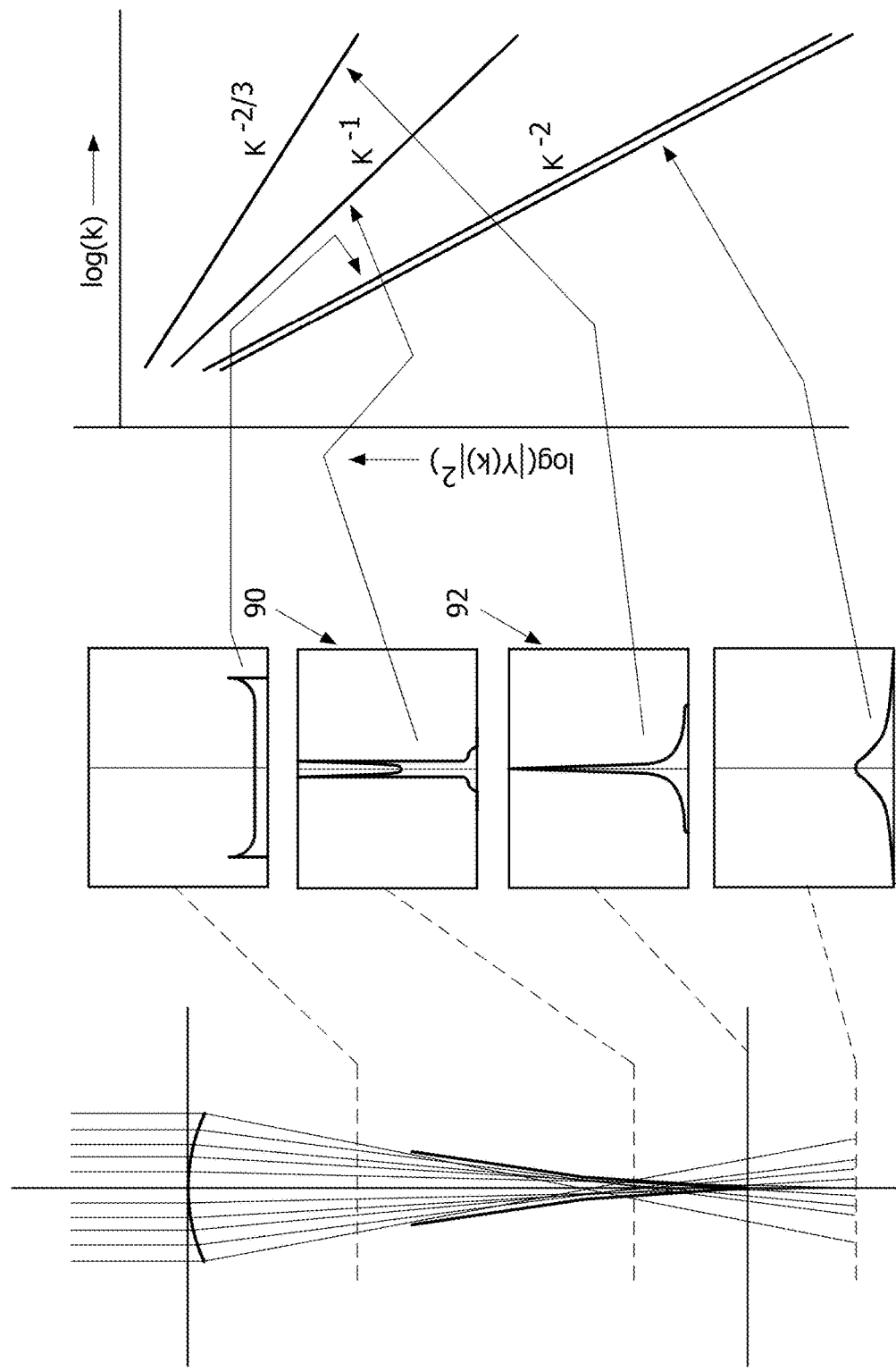
FIG. 12 shows the decay of the power of the beam profile spectrum at different cross-sections.

FIG. 12 on the right shows the decay of the power spectrum of the beam profile spectrum at different cross-sections. Clearly, the profile 92 at the caustic tip has the slowest decaying power spectrum. If the caustic tip is not present, which is the case at sufficiently large angles of incidence of the beam on the lens, then the profile 90 at the caustic edge has the next best beam profile spectrum.

Figure 13:
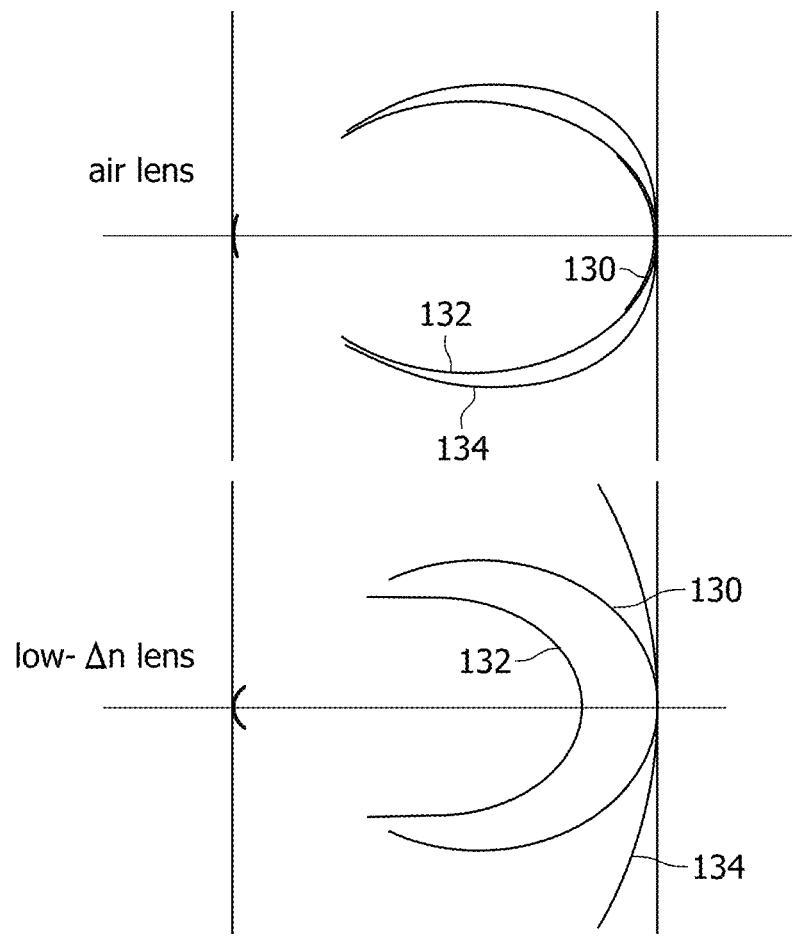
FIG. 13 is used to explain the difference between the lens of the invention and the conventional lens in respect of the sharpness across ranges of input angles.

The analysis above enables a maximum sharpness point to be defined, as the point where the power spectrum of the profile decays most slowly. There is a clear difference between the low refractive index difference lens and the conventional lens, as shown in FIG. 13.

Plot 130 is the position of the focus defined as the intersection of the adjacent rays that impinge upon the lens surface close to the center of the lens (i.e., the crossing of the lens surface and the optical axis). Plot 132 is the position of the point where the Root Mean Square (RMS) width of the beam is smallest. Differently stated, the point where the cross section of the beam is smallest. The significant difference is the maximum sharpness point shown by plot 134. For the low-Δn lens, this curve has a much larger radius of curvature when compared to the normal lens. This means that for larger angles of incidence, the maximum sharpness point remains comparatively much closer to the original focal plane. In fact, the curve for the low-Δn lens is made up by the caustic tip point rotating around the centre of the lens (in this case "center" means the center of the sphere which forms the lens). For the normal lens, the curve for larger angles is made up by a point on the caustic edge region (the tip is missing).

Figure 14:
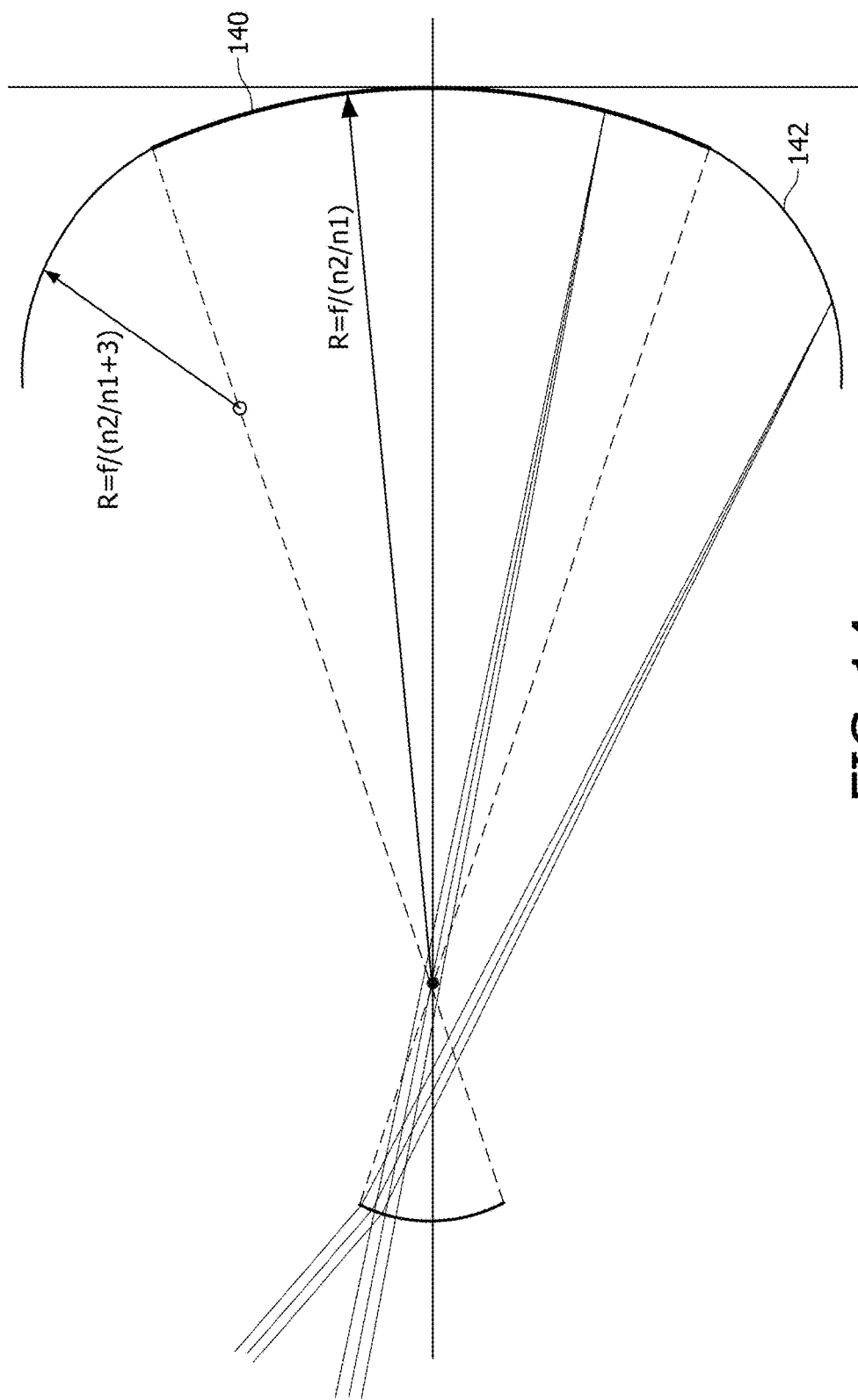
FIG. 14 shows the plot of maximum sharpness for the lens of the invention.

Thus, it can be seen that if the lens can be designed to provide a caustic tip region which covers all angles of incidence, then the sharpness can be improved. FIG. 14 shows the plot of maximum sharpness and shows the caustic tip region 140 and caustic edge region 142. The caustic tip is present if one of the incoming rays hits the lens surface perpendicularly. This ray goes through the center of the sphere defining the lens surface. If the angle of incidence of the rays is too large (for a given aperture of the lens), the tip is no longer present.

Figure 15:
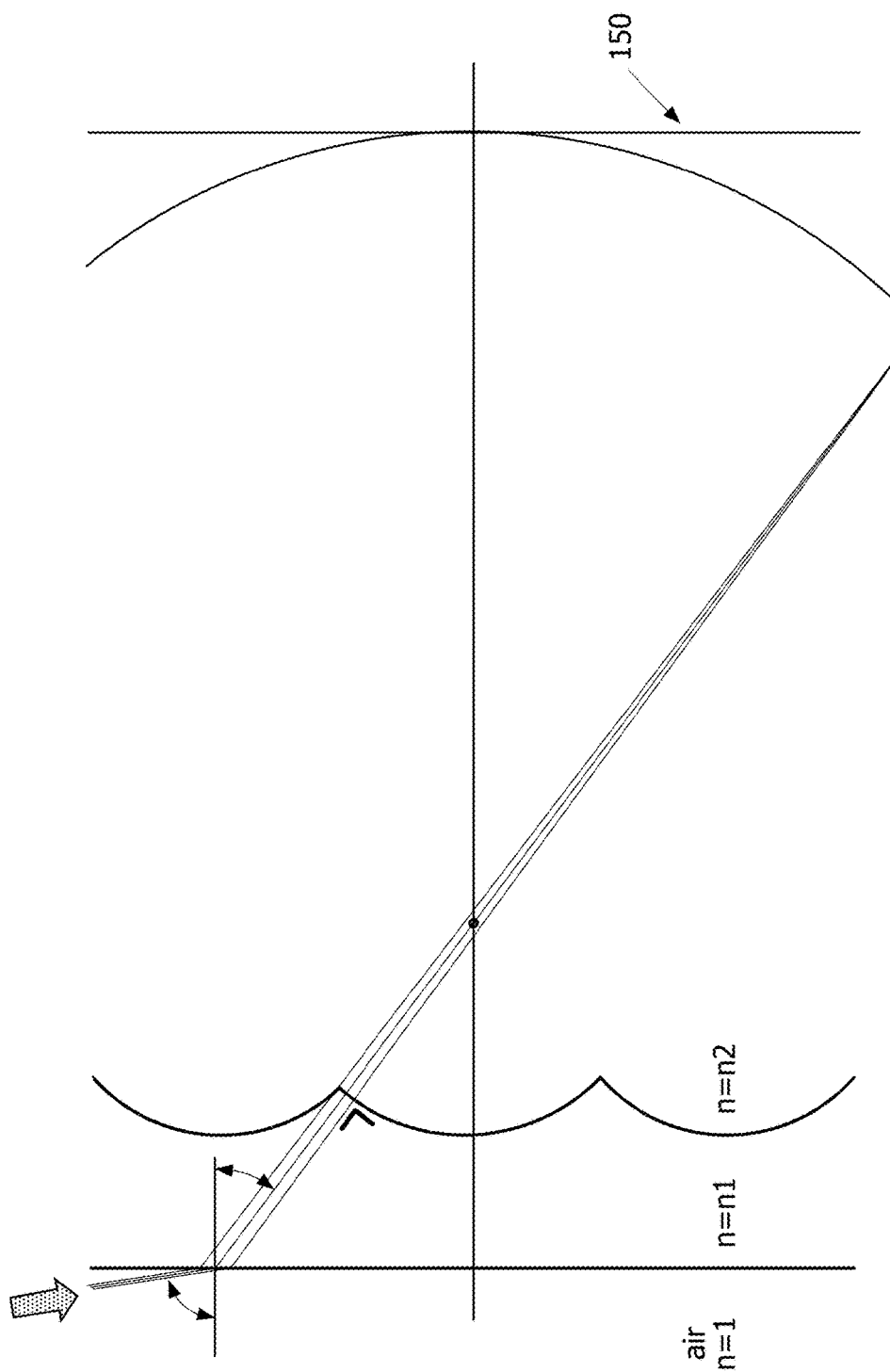
FIG. 15 shows schematically how the lens of the invention provides improved sharpness.

This enables a set of design parameters for the lens to be determined. As shown in FIG. 15, Incoming rays are bent towards the normal, confining the angular range within the first layer of an optical arrangement. The lens can be designed with Δn sufficiently small, i.e., the lens is sufficiently curved, such that for every incoming angle (corresponding to the full angular range in air), at least one ray hits the lens surface perpendicularly. This design rule then provides a region of greatest sharpness close to the pixel plane, and thereby provides the advantages outlined above.

The pixel plane of the display is in the vicinity of the vertical line 150, and the viewer is at the left. For simplicity, FIG. 15 shows rays being directed from the viewer towards the display but the analysis does not change when considering light directed through the display pixels to the viewer.

There are a number of ways to characterize the lens design to provide this continuous caustic tip, which, in turn, gives rise to the improved sharpness explained above.

Figure 16:
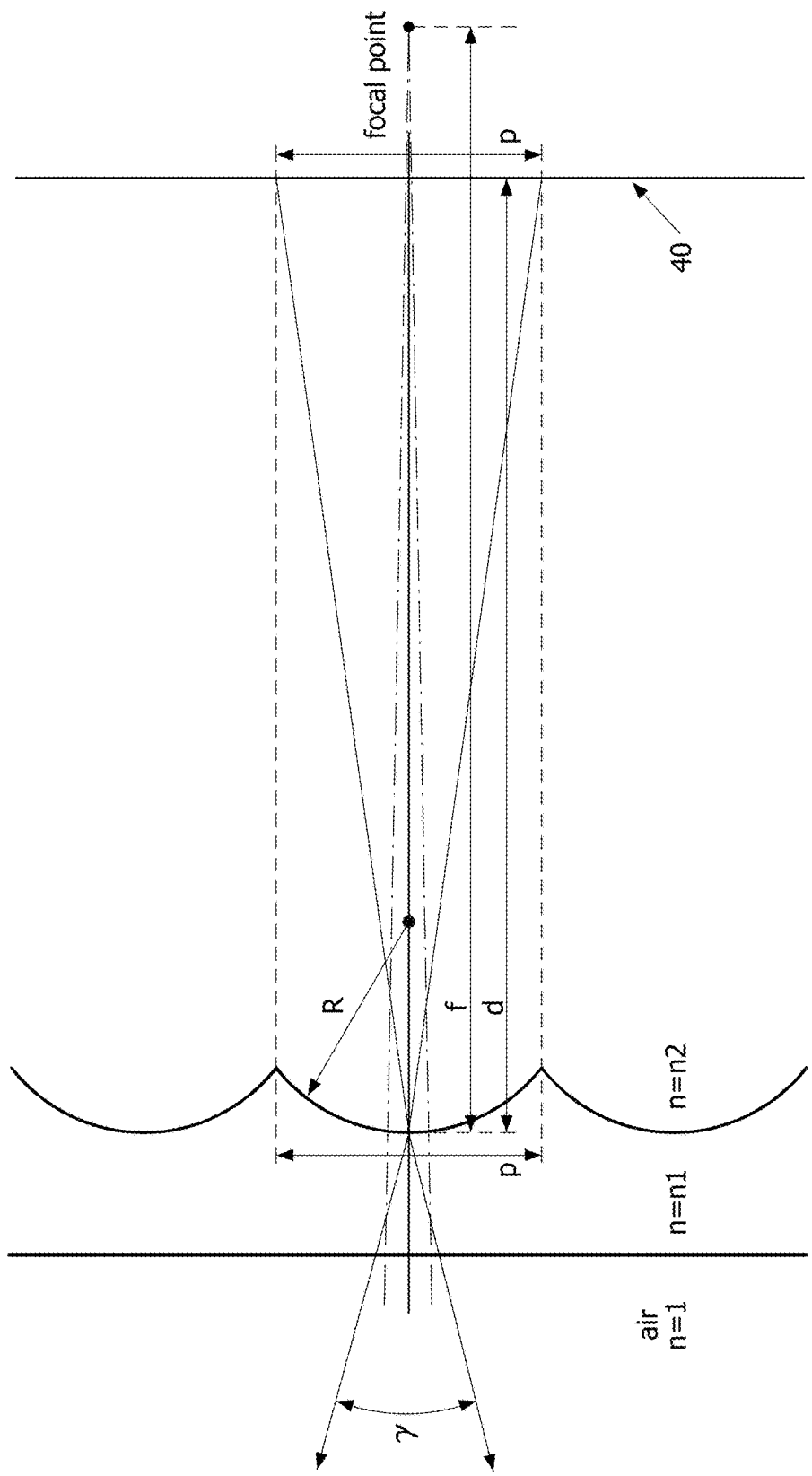
FIG. 16 is used to show the various lens geometrical parameters.

FIG. 16 is used to show the various lens geometrical parameters.

The number of views is determined by the lens pitch p. The range of viewing angles, defined by the primary cone angle α, is determined by the lens pitch p, the distance d from the pixel plane 40 to the lens, and the refractive index n2.

Given p, d, n1 and n2, the lens radius R is optimized for minimum banding. This lens radius R determines the focal length f, which is slightly larger than the distance d in the example shown. It is known to offset the pixel array from the focal distance, in order to reduce the effect of imaging of the black mask layer of the LCD panel.

In addition to the low refractive index difference discussed above, the optical performance of the lens can be characterized by a parameter $n1(p/2R)$, where the values of n1, p and R are all shown and explained with reference to FIG. 16. This dimensionless parameter takes into account the lens curvature as well as the focal distance, and the bending of light as it enters the lens body. In particular, with n1 defined as the part of the lens arrangement on the viewer side, this takes into account the bending at the air interface on the viewer side. This parameter enables the requirement for light to be incident perpendicularly to the lens surface to be satisfied.

Figure 17:
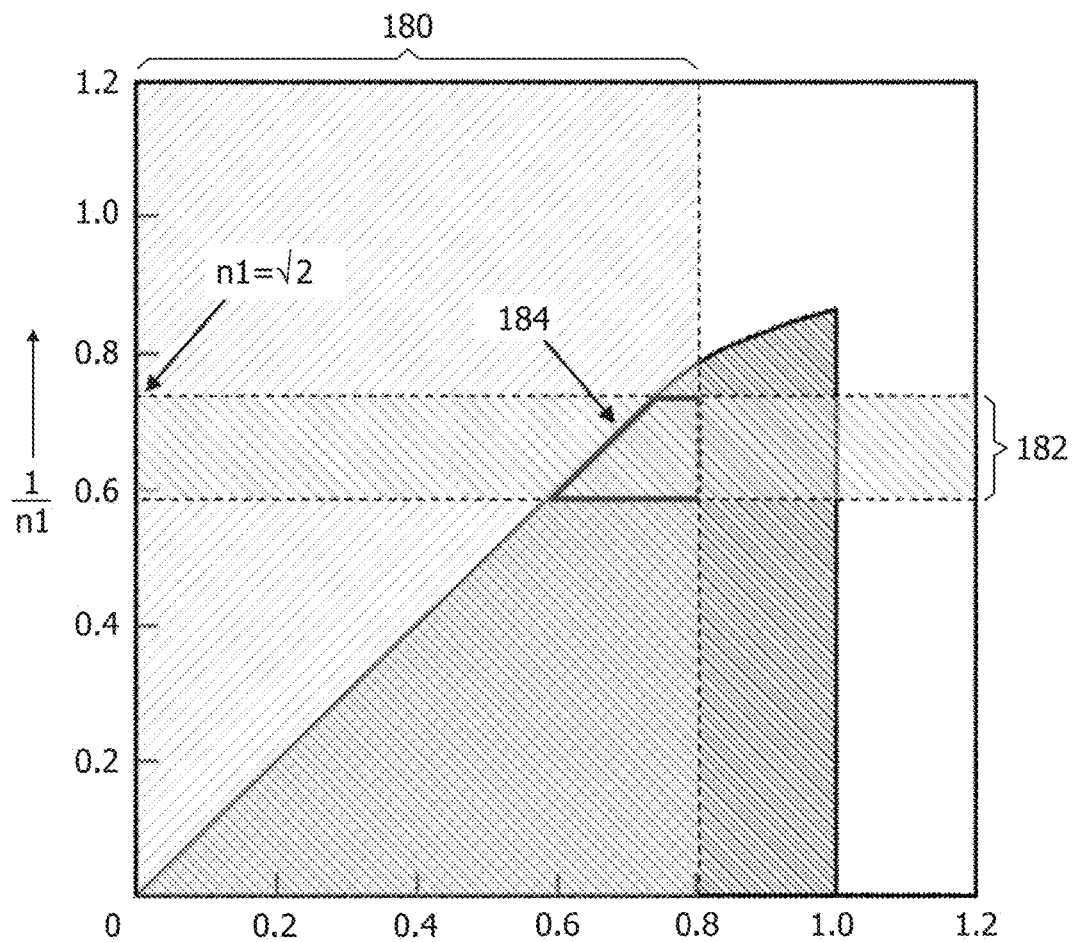
FIG. 17 is used to show the region for which perpendicular light incidence is ensured.

FIG. 17 shows the region for which perpendicular incidence is ensured as the shaded region. The sloping left boundary of the shaded area is determined by:

For $n1 > \sqrt{2}$ $$n1(p/2R)=1$$

For $n1 <= \sqrt{2}$ $$n1(p/2R)=n1^2/2\sqrt{(n1^2-1)}$$

The right vertical boundary is given by:

$$p/2R=1.$$

For a circular lens, the pitch cannot exceed two times the radius, and this dictates the right boundary.

The boundary of the area in FIG. 17 is based on $n1(p/2R)=1$ and points within the boundary satisfy $n1(p/2R)>1$.

The invention applies more generally to values of $n1(p/2R)>0.6$. More preferably, $n1(p/2R)>0.8$. Even more preferably, $n1(p/2R)>1$.

In FIG. 17, region 180 represents feasible lens geometries, and region 182 represents currently most readily available materials for the lens body (excluding n1=1). This gives a region 184 which is based on currently available materials and which satisfies the most preferred lens design parameter range of the invention.

The examples of FIGS. 8 to 17 have n1<n2 with the outwardly curved lens faces pointing to the viewer. The same relation holds for the geometry where the lenses are pointing in the reverse direction, for example as shown in FIG. 5. In this case, the outwardly curved lens faces point towards the display panel, and n1>n2 to create a positive lens.

The invention is applicable to all types of positive lenses and has its advantageous effect in all types of lenticular lens based autostereoscopic displays. Thus, the refractive index difference between the layers forming the lens interface need not be small, as long as the relation of the refractive index, the lens pitch and the lens surface curvature according to the invention is fulfilled, as then the advantageous effect is obtained.

In practice the lens system may consist of more than two or three media, e.g., intermediate glass plates/layers or air gaps.

The discussion and analysis above is based on spherical lenses. However, aspherical lenses may be used (for example, having two effective radii). The analysis above can then be considered to be based on the effective lens radius at the center of the lens (along the central optical axis).

The refractive index of a material depends on the wavelength of the light. This is usually expressed in terms of the so called "Abbe number". Due to the wavelength dependence, the focus of the lens depends on the color of the light. When making a lens of two materials with only a small difference in refractive index, the color dependency of the lens as a whole will scale up with roughly a factor of $(n_{acrylic}-n_{air})/(n_{acrylic}-n_{silicone}) \approx 5$, resulting in color dependent banding. To avoid this, the Abbe numbers of the different materials should be matched.

The Abbe number is defined as:

$$V = \frac{n_D - 1}{n_F - n_C}$$

wherein $n_D$, $n_F$, $n_C$ are refractive indices of the material at the D- F- and C-spectral lines (589.2 nm, 486.1 nm, 656.3 nm respectively).

The refractive index differences mentioned above "in the visible spectrum" may be assumed to be measured at a single point within the visible spectrum, for example, the D3 helium line at 587.5618 nm.

The lenticular lenses are preferably slanted with respect to the columns of pixels of the display, and this is a known measure to share the loss of resolution resulting from the lens array between the row and column directions of the display.

The design of liquid crystal display has not been explained in detail, or the image processing required to generate the required multiple views. These are all standard, and the invention provides a change only to the lens design.

In the example above, the first lens layer 55A is an acrylic material, but it may instead be a polycarbonate material (refractive index n=1.59-1.60), and this could be combined with a silicone material as the second lens layer 55B.

In an embodiment as represented by FIGS. 18A and 18B, the optical arrangement may have an area 200 as represented by FIG. 18B wherein the interface between the layers defining the lens surface is substantially flat. This non-lens area may then be used to display, for example, 2D data of any kind. The non-lens area (200) then has the same refractive index difference as the lens area FIG. 18A with the advantage that the boundary between the two areas will be masked, i.e., will be less visible for a viewer compared to a situation where a non-lens area is not provided with the layered structure of the lens area having the low refractive index differences. Hence, a display appearance is improved. It will be clear that multiple of such areas may be provided as well as that multiple lens areas may be provided according to need. Such may be important for display systems that must provide 3D data and 2D data at the same time. This arrangement and corresponding display having a non-lens area with the two layers with low refractive index may also be used independently from the requirement of lens radius as defined by the feature 'wherein the product of the first refractive index with the lens pitch divided by two times the radius of curvature is greater than 0.6' in the current invention without loss of the described advantage.

The invention can be used in displays generally, and this includes electronic photo frames and other display output devices.

Various modifications will be apparent to those skilled in the art.

Preferably, the surfaces of the first and second layers opposite to those forming the lens surface are both planar. While one of these surfaces allows easy mounting of the lens arrangement on a planar surface of a display device such as a regular liquid crystal display (LCD), the other may be provided with additional layers, such as, for example, anti-reflection coatings, and/or other optical layers, and/or anti-scratch and/or other protection coatings. Hence, the additional layers are advantageously not situated between the lens arrangement and the surface of the display panel, thereby not disturbing the optical effect or optical output of the autostereoscopic display device achieved with the lens arrangement.

The present invention is applicable to all optical arrangements with a lens function, especially when used for autostereoscopic display. Thus, the optical arrangement may be a switchable arrangement having the lens function according to the invention in one mode and another optical function in a further mode. An optical arrangement that is switchable may, for example, be constructed as described in International Patent Publication No. WO1998/021620A1. The optical arrangement then comprises an electrode structure and a liquid crystal (LC) material to function as one of the first or second layer of the optical arrangement. The refractive index of the liquid crystal layer is anisotropic and dependent on the orientation of the liquid crystal molecules. The electrode structures serve to provide electrical fields across the layer in order to align the LC molecules in one of the modes of the optical arrangement. Thus, in the lens mode, the LC molecules are oriented such that there is a refractive index difference between the first and second layers, while in the further mode, this refractive index difference may be substantially absent due to appropriate reorientation of the LC molecules thereby benefiting from a different refractive index of the LC layer.

Other principles of providing switchable lens arrangements may be used to prepare an optical arrangement according to the invention. Thus, for example, fluid focus lenses may be used.

In general the invention comprises the following advantageous embodiments:

1. An optical arrangement having at least a lens mode in which it is a lens arrangement comprising an array (9) of positive lenticular lenses (11), each respective one of the positive lenses comprising a first layer and second layer having an interface between each other defining the lenticular lens surface, the first layer having a first refractive index and the second layer having a second refractive index that is different from the first refractive index, the lens array having a lens pitch and the lenticular lens surfaces having a radius of curvature at their center, wherein the product of the first refractive index with the lens pitch divided by two times the radius of curvature is greater than 0.6.

2. An optical arrangement according to embodiment 1, wherein the product is greater than 0.8.

3. An optical arrangement according to embodiment 1, wherein the product is greater than 1.

4. An optical arrangement according to embodiment 1, wherein the lens arrangement has a viewer side opposite to a display side and the first layer is on the viewer side of the lens arrangement.

5. A lens arrangement according to any of the previous embodiments, wherein the first refractive index is the lowest refractive index of the first and second refractive indices.

6. A lens arrangement according to any of the previous embodiments, wherein the absolute value of the refractive index difference between the first and second refractive indices is in between 0.05 and 0.22.

7. A lens arrangement according to embodiment 6, wherein the absolute value is between 0.05 and 0.15.

8. A lens arrangement according to any of the previous embodiments, wherein the highest refractive index of the first and second refractive indices is in the range 1.4 to 1.65.

9. A lens arrangement according to any of the previous embodiments, wherein the lowest refractive index of the first and second refractive indices is in the range 1.3 to 1.5.

10. A lens arrangement according to any of the previous embodiments, wherein the first layer and the second layer are optically isotropic.

11. A lens arrangement according to any of the previous embodiments, wherein the first and second layers have substantially the same Abbe number.

12. A lens arrangement according to embodiment 1 having an area wherein the interface between the first layer and the second layer is substantially flat.

13. An autostereoscopic display device comprising:
an image providing means (3) and an optical arrangement (9) according to any of the previous embodiments positioned in front of the image providing means.

14. An autostereoscopic display device to embodiment 13, wherein the image forming means is an electronic display panel (3)

15. An autostereoscopic display device according to any of the embodiments 13 and 14, wherein the optical arrangement is positioned such that when in the lens mode, the first layer is on the viewer side of the optical arrangement.

16. An autostereoscopic device according to any of the embodiments 13 and 14, wherein the lens arrangement is positioned such that the second layer is closer to the image providing means than the first layer and wherein the second refractive index is the lowest refractive index of the first and the second refractive indices.

17. A method of displaying an autostereoscopic image, comprising providing an image comprising multiple views and projecting the image through a lens arrangement according to any of the embodiments 1 to 12.

And more specifically the invention is claimed by the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. An optical arrangement having at least a lens mode in which it is a lens arrangement comprising an array of lenticular lenses which comprise a first layer and a second layer having an interface between each other defining a surface of the array of lenticular lenses, the first layer having a first refractive index at the 587.5618 nm D3 helium line and the second layer having a second refractive index at the 587.5618 nm D3 helium line which is larger than the first refractive index, wherein the lens surface of each lenticular lens defines a convex lenticular lens shape for rays entering the lenticular lens from the second layer, and has a particular lens surface shape with sufficient curvature such that, when tracing rays through a lenticular lens after they have entered one side of the lenticular lens opposite the side with the lens surface shape, there exists at least one ray, for every incoming angle to said one side, that hits the lenticular lens surface perpendicularly, and wherein the difference between the second and the first refractive indices is in the range 0.05-0.15.

2. The optical arrangement as claimed in claim 1, wherein the optical arrangement is for positioning between a display device and a viewer, wherein the first layer is positioned at the side of the viewer.

3. The optical arrangement as claimed in claim 1, wherein the difference between the second and the first refractive indices is in the range 0.09-0.12.

4. The optical arrangement as claimed in claim 1, wherein the second refractive index is in the range 1.4-1.65.

5. The optical arrangement as claimed in claim 1, wherein the first refractive index is in the range 1.3-1.5.

6. The optical arrangement as claimed in claim 1, wherein the first layer and the second layer are optically isotropic.

7. The lens arrangement as claimed in claim 1, wherein the first and second layers have substantially the same Abbe number.

8. The lens arrangement as claimed in claim 1, having an area wherein the interface between the first layer and the second layer is substantially flat.

9. An autostereoscopic display device comprising:
an image providing means and an optical arrangement according to claim 1, wherein the optical arrangement is positioned in front of the image providing means.

10. The autostereoscopic display device as claimed in claim 9, wherein the image forming means is an electronic display panel.

11. The autostereoscopic device as claimed in claim 9 or 10, wherein the optical arrangement is positioned such that the second layer is closer to the image providing means than the first layer.

12. A method of displaying an autostereoscopic image, comprising providing an image comprising multiple views and projecting the image through an optical arrangement as claimed in claim 1.

* * * * *